(12) United States Patent
Knapp et al.

(10) Patent No.: US 6,310,730 B1
(45) Date of Patent: Oct. 30, 2001

(54) OPTICAL SYSTEM WITH ASYMMETRIC OPTICAL CORRECTOR

(75) Inventors: David Knapp, Tucson, AZ (US); Scott W. Sparrold, Bothell, WA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/495,610

(22) Filed: Feb. 1, 2000

Related U.S. Application Data

(63) Continuation-in-part of application No. 09/164,436, filed on Sep. 30, 1998, now Pat. No. 6,028,712.
(60) Provisional application No. 60/060,870, filed on Oct. 2, 1997.

(51) Int. Cl.[7] .................. G02B 27/22; G02B 13/06; G02B 7/02
(52) U.S. Cl. .................. 359/642; 359/479; 359/725; 359/637; 359/554; 359/815; 359/753; 244/3.17; 244/3.23; 250/203.1; 250/203.6; 250/236
(58) Field of Search .................. 359/642, 725, 359/712, 637, 635, 815, 823, 479, 506, 554, 894, 511, 749, 753, 708; 244/3.17, 3.1, 3.15, 3.23; 235/462.01; 250/201.9, 203.1, 203.6, 236

(56) References Cited

U.S. PATENT DOCUMENTS

| | | | |
|---|---|---|---|
| 3,841,585 | | 10/1974 | Evers-Euterneck .................. 244/3.15 |
| 4,010,365 | * | 3/1977 | Meyers et al. .................. 250/236 |
| 4,019,804 | * | 4/1977 | Collier .................. 359/216 |
| 4,111,558 | | 9/1978 | Ikemori .................. 359/708 |
| 4,123,134 | * | 10/1978 | Meyers .................. 359/216 |
| 4,705,343 | * | 11/1987 | Simons .................. 359/354 |
| 5,042,914 | * | 8/1991 | Hulderman et al. .................. 359/824 |
| 5,285,461 | * | 2/1994 | Krasutsky et al. .................. 250/234 |
| 5,526,181 | * | 6/1996 | Kunick et al. .................. 359/613 |
| 5,814,803 | | 9/1998 | Olmstead .................. 235/462.01 |
| 6,028,712 | * | 2/2000 | McKenney et al. .................. 359/642 |
| 6,180,938 | * | 1/2001 | Crowther et al. .................. 250/216 |

OTHER PUBLICATIONS

Optical Research Associates, Code V Version 8.30 Reference Manual, vol. I, pp. 2A–452 to 2A–453.

* cited by examiner

*Primary Examiner*—Evelyn A Lester

(57) ABSTRACT

An optical system includes a curved window, an asymmetric, scoop-shaped optical corrector adjacent to a curved inner surface of the window, an optical train positioned such that the optical corrector lies between the curved window and the optical train, a movable optical train support upon which the optical train is mounted, and a sensor disposed to receive an optical ray passing sequentially through the window, the optical corrector, and the optical train. The optical corrector has an inner surface and an outer surface, at least one of which has a shape defined by an asymmetric polynomial.

16 Claims, 4 Drawing Sheets

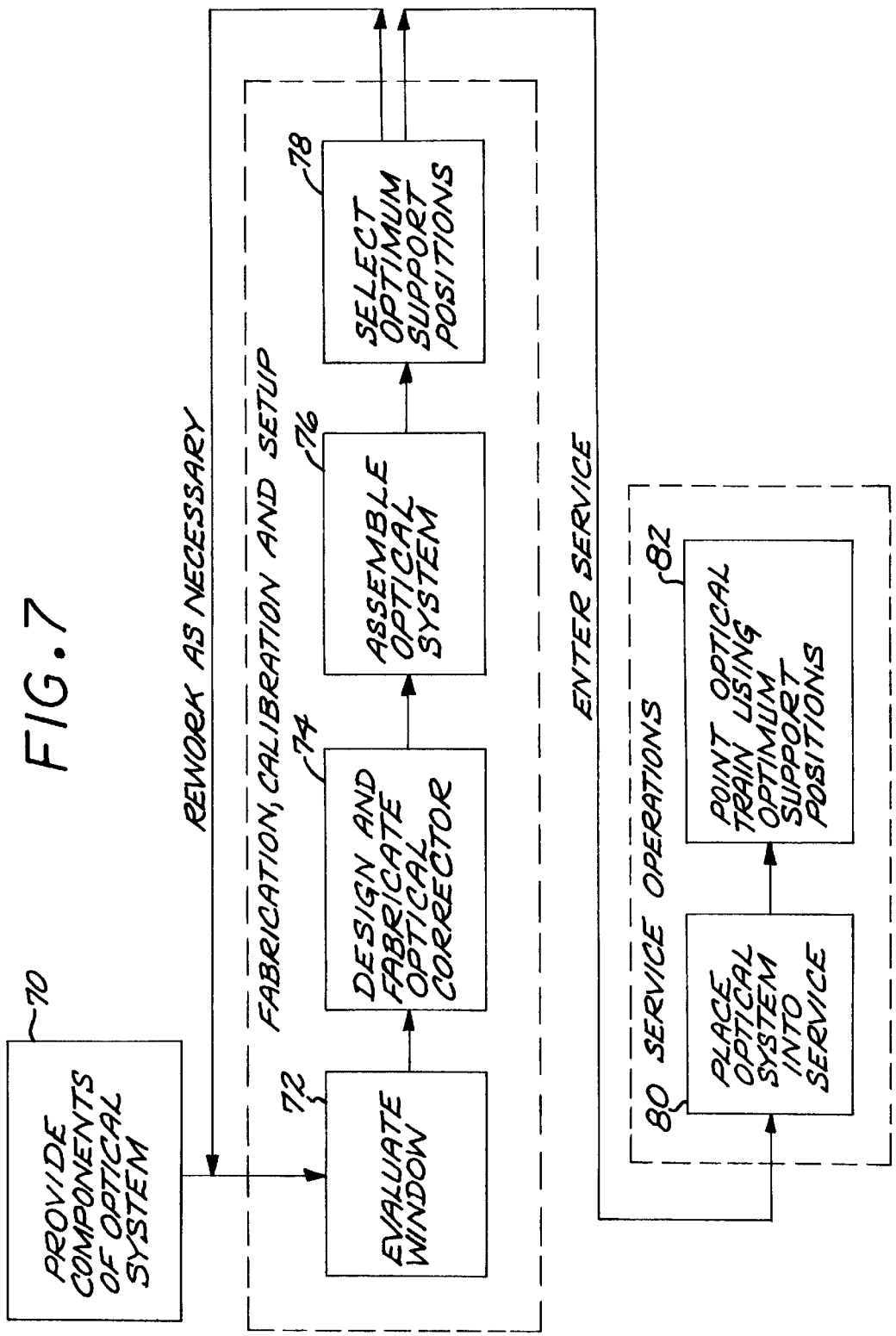

OPTICAL SYSTEM WITH ASYMMETRIC OPTICAL CORRECTOR

This application is a continuation-in-part of application Ser. No. 09/164,436, filed Sep. 30, 1998, now U.S. Pat. No. 6,028,712 for which priority is claimed and whose disclosure is hereby incorporated herein by reference; application Ser. No. 09/164,436 in turn claims priority to, and the benefit of, U.S. Provisional Application No. 60/060,870, filed Oct. 2, 1997, whose disclosure is hereby incorporated herein by reference.

BACKGROUND OF THE INVENTION

This invention relates to an optical system having a window therein, and in particular to such an optical system having an optical corrector that reduces aberration introduced by the passage of an optical ray through the window.

An optical sensor receives radiated energy from a scene and converts it to an electrical signal. The electrical signal is provided to a display or further processed for pattern recognition or the like. Optical sensors are available in a variety of types and for wavelengths ranging from the ultraviolet, through the visible, and into the infrared. In some applications the optical sensors are fixed in orientation, and in others the optical sensors are movable by pivoting and/or rotational motions to allow sensing over a wide angular field of regard.

The optical sensors generally employ a photosensitive material that faces the scene and produces an electrical output responsive to the incident energy. The photosensitive material and remainder of the sensor structure are rather fragile, and are easily damaged by dirt, erosion, chemicals, or high air velocity. In service, the sensor is placed behind a window through which it views the scene and which protects the sensor from such external effects. The window must be transparent to the radiation of the operating wavelength of the sensor and resist attack from the external forces. The window must also permit the sensor to view the scene over the specified field of regard.

The window would ideally introduce no wavefront aberration at the center of the field of view, other than possibly spherical aberration, particularly if the sensor is an imaging sensor. The thicker and more highly curved is the window, the more likely is the introduction of significant wavefront aberration. A wide variety of sensor windows have been used in various aircraft applications. In many cases such as low-speed commercial helicopters, flat windows are acceptable. Windows that are shaped as segments of spheres are used in aircraft and missile applications, but for these windows the wavefront aberration tends to be high if the gimbal location is not at the spherical window's center of curvature. In all of these window types, if the window must be wide or must project a substantial distance into an airflow to permit a large field of regard, the aerodynamic drag introduced by the window is large.

For applications involving aircraft (including missiles) operating at high speeds, the window should be relatively aerodynamic such that the presence of the window extending into the airstream does not introduce unacceptably high and/or asymmetric aerodynamic drag to the vehicle. A nonspherical or conformal window is therefore beneficial to reducing drag and increasing the speed and range of the aircraft. However, available conformal windows introduce large wavefront aberrations into the sensor beam, particularly for high azimuthal pointing angles of the sensor.

The wavefront aberration may be corrected computationally, but the amount of processing may be great. To reduce the amount of computation or eliminate the need for computation, the wavefront aberration of the image may be minimized optically, either in the optical processing components or by providing a particular shape in the window. Available approaches have not been fully successful in accomplishing this type of correction. Accordingly, there is a need for an improved approach to providing a corrected image in an optical system viewing a scene through an aspheric window. The present invention fulfills this need, and further provides related advantages.

SUMMARY OF THE INVENTION

The present invention provides an optical system and a method for providing corrected optical images using the optical system. The optical system is used with many types of aspheric windows. It may be tailored to provide minimal wavefront aberration over a wide range of azimuthal pointing angles of the sensor of the optical system.

In accordance with the invention, an optical system comprises a curved window, an optical train including at least one optical element (such as a lens, a mirror, or a prism) operable to alter an optical ray incident thereon, and a movable optical train support upon which the optical train is mounted. The optical train support preferably includes a gimbal such as a roll-nod gimbal. The optical train support is operable to point the optical train along a plurality of directions, the plurality of directions including a z axis lying perpendicular to a reference plane having orthogonal x and y axes lying therein. An optical corrector is disposed in an optical path between the window and the at least one optical element of the optical train. The optical corrector has an optical corrector shape responsive to a shape of the window. The optical corrector comprises a transparent body having a shape which is bilaterally symmetric about the z axis in a yz cross section and is not bilaterally symmetric about the z axis in an xz cross section. The optical corrector may optionally be mounted on a movable optical corrector support. A sensor is disposed to receive the optical ray passing sequentially through the window, the optical corrector, and the optical train.

The optical corrector has an inner surface and an outer surface, and preferably at least one of the inner surface and the outer surface of the optical corrector has a shape defined by an asymmetric modified XY polynomial. The shape is desirably defined by $$z = \frac{cr^2}{1 + \sqrt{1 - (1+k)c^2 r^2}} + \sum C_j x^m y^n$$

wherein z is the coordinate oriented perpendicular to the reference plane, c is a constant vertex curvature, k is a conic constant, $r^2 = x^2 + y^2$, x and y are the coordinates lying in the reference plane, $C_j$ is a constant term, m and n are constants, and $j = [(m+n)^2 + m + 3n]/2 + 1$.

The optical corrector may instead be described as a scoop-shaped piece of transparent material having a curvature different from a curvature of the window.

In a preferred case, the window is mounted to a housing, such as the fuselage of an aircraft, having an axis of elongation coincident with the z axis. Where there is a movable optical corrector support upon which the optical corrector is mounted, the optical corrector support may be movable in a direction parallel to the axis of elongation and/or rotatable about the axis of elongation. Similarly, the optical train support may be movable in a direction parallel to the axis of elongation and/or rotatable about the axis of elongation.

The optical system thus includes the aspheric window, which introduces an aberration into the optical ray that is dependent upon the pointing angle of the sensor through the window, and the optical corrector, which partially or totally negates the aberration. The optical corrector functions as a corrective lens whose position may optionally be rotated about the axis of elongation and/or moved parallel to the axis of elongation. The position of the optical train may also optionally be adjusted along the axis of elongation. These optical components and their adjustability serve to reduce the aberration introduced by the passage of the optical ray through the window.

The asymmetric optical corrector achieves increased optical performance as compared with a symmetric optical corrector, by permitting more terms in the relation defining the shape of the surfaces of the optical corrector. This increased performance is achieved at the cost of the loss of symmetry about the z axis, and the associated need for more support movement in most situations.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 7 is a block flow diagram for an approach to designing, manufacturing, and using the optical system.

DETAILED DESCRIPTION OF THE INVENTION

Figure 1:
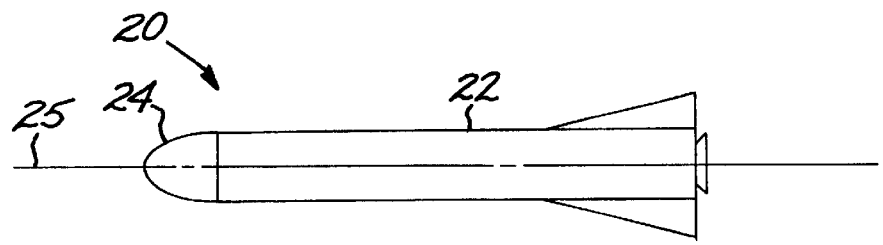
FIG. 1 is an elevational view of a missile having a nose-dome window.

FIG. 1 depicts a flight vehicle, in this case a supersonic missile 20, having a fuselage 22 with a curved window 24 attached thereto. The window 24 is illustrated as a nose dome that protrudes at least partially into the airstream of the missile 20. The fuselage is elongated along an axis of elongation 25, and in a preferred application the window 24 is rotationally symmetric about the axis 25. The missile 20 with the nose-dome window 24 is the preferred application of the optical system of the invention, but it is applicable in other contexts as well such as other missile windows and windows on manned aircraft.

Figure 2:
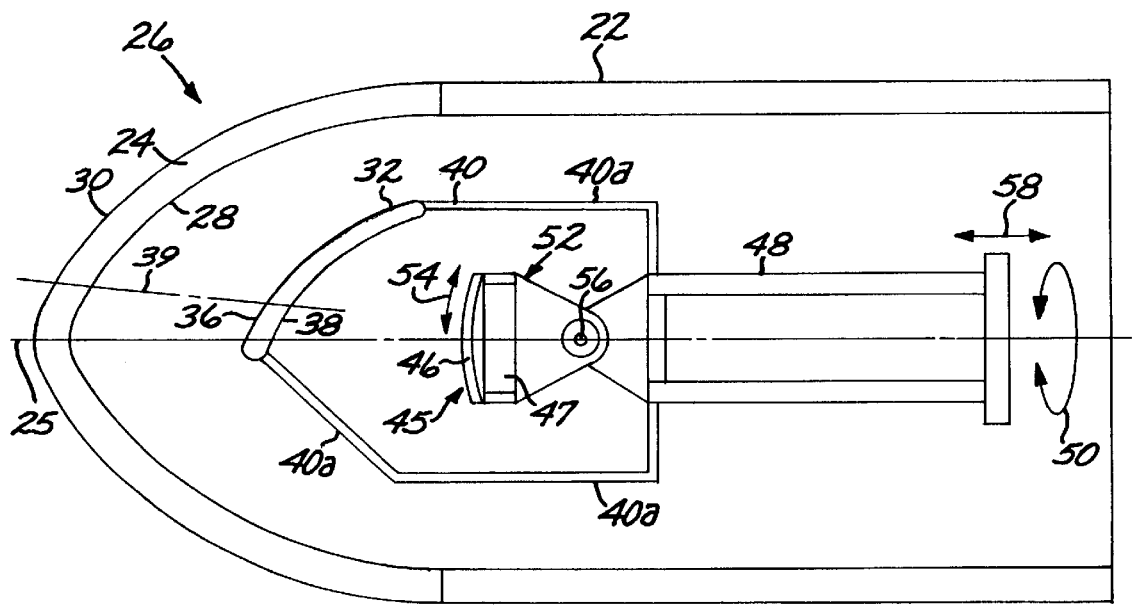
FIG. 2 is a schematic diagram of first embodiment of an optical system according to the invention.
Figure 3:
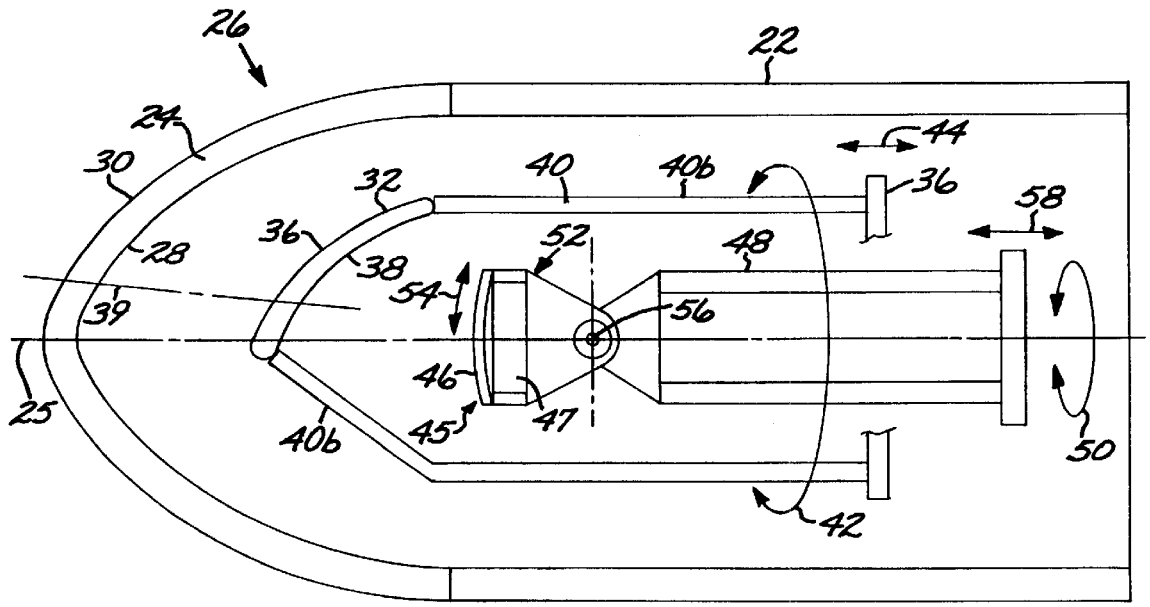
FIG. 3 is a schematic diagram of second embodiment of an optical system according to the invention.

The window 24 is part of an optical system 26, two embodiments of which are shown generally in FIGS. 2 and 3. The optical system 26 includes the window 24 attached to the fuselage 22, which serves as a housing for the optical system 26. A curved inner surface 28 of the window 24 is the concave surface of the window 24 that faces the inside of the fuselage 22. A curved outer surface 30 of the window 26 is the convex surface of the window 24 that faces outwardly and projects into the airstream as the missile 20 flies. The window 24 has a spatially dependent curvature.

An optical corrector 32 is located adjacent to the inner surface 28 of the window 24. The optical corrector 32 is a curved piece of material transparent to the radiation being sensed by the optical system 26 and its sensor. For example, for a visible radiation optical system, the optical corrector 32 may be glass.

Figure 4:
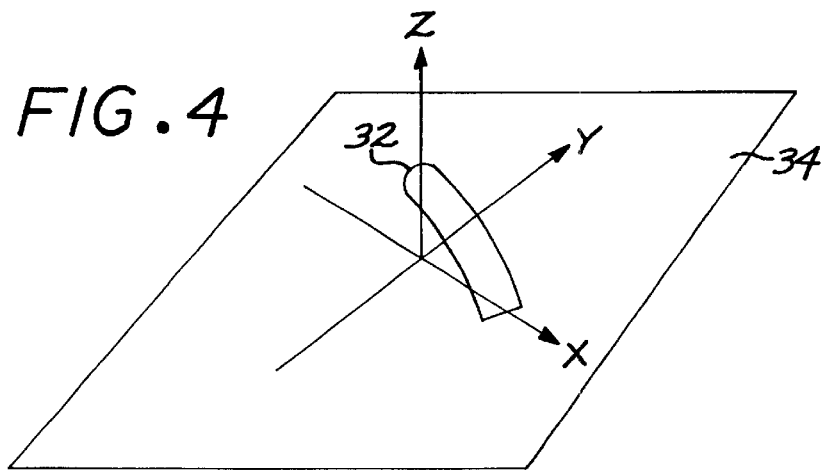
FIG. 4 is a perspective view of the optical corrector of the first embodiment of FIG. 2.
Figure 5A:
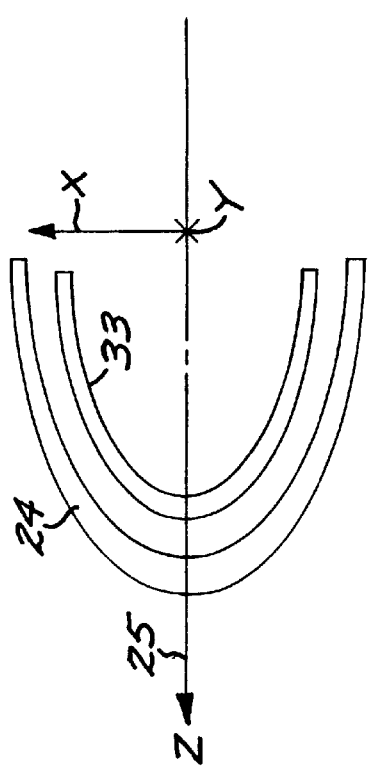
FIGS. 5A–5B are schematic sectional views of the window and asymmetric optical corrector of the invention, in the xz section (FIG. 5A) and the yz section (FIG. 5B)
Figure 5B:
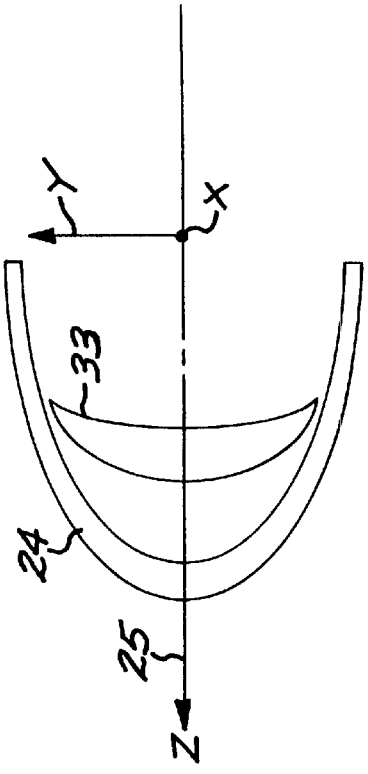

The optical corrector 32 is a piece of the transparent material. The optical corrector 32 may be described by three orthogonal Cartesian coordinates in terms of its shape relative to a reference plane 34, illustrated in FIG. 4, having x and y axes lying in the plane 34 and axis z perpendicular to the plane 34. The optical corrector 32 is a curved asymmetric body, as illustrated in FIGS. 2–5. As seen in FIG. 4, relative to the reference plane 34 the optical corrector 32 extends from about the z axis to about the xy plane on one side only. FIGS. 5A and 5B are schematic sectional views showing the views in the xz and yz planes, respectively, of FIG. 4. The optical corrector 32 is asymmetric about the z axis in the xz plane (FIG. 5A), and is desirably symmetric about the z axis in the yz plane (FIG. 5B). This optical corrector 32 of the invention may be compared with a full-arch, symmetrical optical corrector 33, which is not within the scope of the invention, shown in the same xz and yz sections in FIGS. 6A and 6B, respectively. The symmetrical optical corrector 33 is a full arch and is symmetric about the z axis in both the xz (FIG. 6A) and yz (FIG. 6B) sectional views.

The optical corrector 32 has an outer surface 36 and an inner surface 38. At least one, and preferably both, of the outer surface 36 and the inner surface 38 are defined by an asymmetric modified XY polynomial. Preferably, the asymmetric modified polynomial is of the form $$z = \frac{cr^2}{1 + \sqrt{1 - (1+k)c^2 r^2}} + \sum C_j x^m y^n$$

wherein z is the coordinate oriented perpendicular to the reference plane, c is a constant vertex curvature, k is a conic constant, $r^2 = x^2 + y^2$, x and y are the coordinates lying in the reference plane, $C_j$ are constants selected by the techniques discussed subsequently, m and n are constants, and $j = [(m+n)^2 + m + 3n]/2 + 1$. This asymmetric modified polynomial may be viewed as a base conic shape (the first term) plus an XY polynomial (the second term). Preferably, both the outer surface 36 and the inner surface 38 have the shape defined by the modified XY polynomial, but not necessarily the same modified XY polynomial. However, one of the surfaces 36 or 38 could have another, non-XY polynomial form.

The XY polynomial term $\Sigma C_j x^m y^n$ is a known form. For example, a discussion of XY polynomials may be found in Vol. I of version 8.30 of the Code V Reference Manual, Optical Research Associates, 1998, pages 2A-452 to 2A-453.

Preferably, the shape is described by the general form using the values of m and n that sum to 10 or less, or $$z = \frac{cr^2}{1+\sqrt{1-(1+k)c^2r^2}} + \sum_{j=2}^{j=66} C_{j+1}x^m y^n$$

where $m+n \leq 10$ and the other values are as stated above.

The optical corrector 32 functions as a lens to correct the aberrations introduced into an optical (light) ray passing through the window 28, and therefore its shape is selected responsive to the shape of the window. Because the aberrations are spatially dependent upon the vector of the optical ray, the optical corrector 32 is formed so that its correction is spatially dependent as well. The aberrations introduced into the optical ray depend upon the exact shape of the window 24, and therefore no specific design may be set forth for the shape of the optical corrector 32. Techniques for determining the design, including the constant values, are discussed subsequently.

Figure 6A:
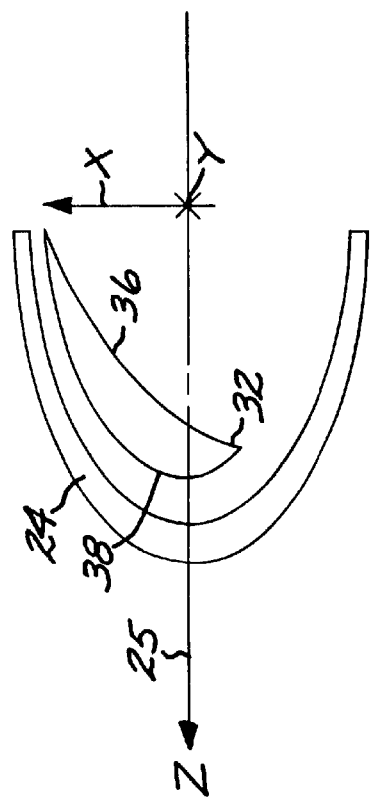
FIGS. 6A–6B are schematic sectional views of the window and a symmetric full-arch optical corrector, in the xz section (FIG. 6A) and the yz section (FIG. 6B)
Figure 6B:
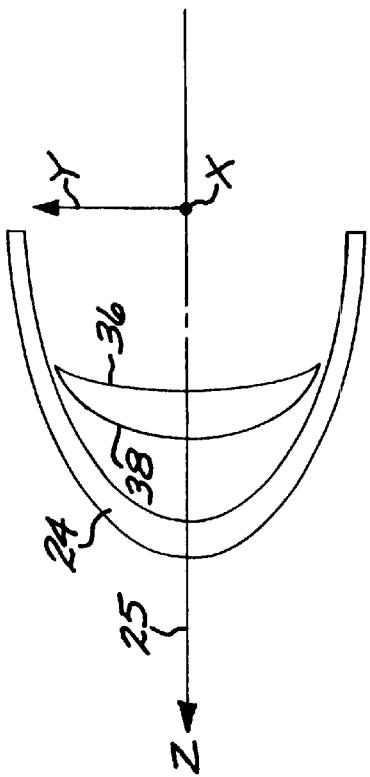

The use of the asymmetric optical corrector 32 relaxes the symmetry constraint associated with the symmetric optical corrector such as that illustrated in FIGS. 6A–6B. The surface shape of the symmetric optical corrector is limited to forms in which there is symmetry about the z axis. For example, in the general form of the XY polynomial, only the even terms of x and y may have a nonzero coefficient $C_{j+1}$. In the present approach, both the even and the odd terms of x and y may have a nonzero coefficient $C_{j+1}$. This change in form allows a greater degree of freedom in selecting the required shape of the surfaces 36 and 38 to reduce the net aberration of an optical ray 39 passing first through the window 24 and then through the optical corrector 32. The result is improved optical performance of the optical corrector 32. This improved optical performance comes at the cost of less symmetry in the optical corrector 32, and the need for more movement of the optical corrector 32 in order to provide full circumferential and azimuthal coverage of the optical system 26.

The optical corrector 32 is mounted on an optical corrector support 40, two types of which are shown in FIGS. 2 and 3, respectively. The optical corrector support 40a of FIG. 2 is a bracket 40a mounted to the optical train support discussed subsequently, and which rotates with the optical train support.

The optical corrector support 40b of FIG. 3 is supported so as to rotate independently about the axis 25, which rotation is indicated schematically at numeral 42, and/or move linearly parallel to the axis 25, which linear movement is indicated schematically at numeral 44. The rotational and linear movements are produced by conventional actuators, which are known for other purposes. The rotational movement 42 of the optical corrector support 40, and thence of the optical corrector 32, allows the optical corrector to be rotationally positioned according to the rotational angle of regard of the optical train, to be discussed subsequently. The axial movement 44 of the optical corrector support 40, and thence of the optical corrector 32, allows different portions of the optical corrector 32 to be used to correct the aberration introduced by the window 24.

An optical train 45 is positioned such that the optical corrector 32 lies between the window 24 and the optical train 45. The optical train 45 includes at least one optical element operable to alter an optical ray incident thereon. In FIGS. 2 and 3, the optical element is illustrated as a refractive lens 46, but it may also include a mirror, a prism, or any other operable optical element. The optical element may also include a combination of such lenses, mirrors, and/or prisms. The detailed design of optical trains is known in the art, and the present invention is not concerned with such design specifics.

The optical train 45 directs incident optical rays 39, which previously passed first through the window 24 and then through the optical corrector 32, into a sensor 47. The sensor 47 is illustrated as a focal plane array sensor, but may be of any operable type. The sensor 47 is selected according to the nature of the energy to be sensed, and is typically a sensor of visible light or infrared energy. The design of such sensors 47 is known in the art. The sensor 47 provides its output as an electrical signal to processing electronics, which are not illustrated but which are known in the art.

The optical train 42 is mounted on a movable optical train support 48. (As described earlier, in the embodiment of FIG. 2 the optical corrector support 40 is attached to the optical train support 48 and moves with the optical train support 48, while in the embodiment of FIG. 3 the optical corrector support 40 is independently supported and movable.) The movement characteristics of the optical train support 48 are selected to permit the optical train 45 to point in the desired directions, and also to take advantage of the corrective properties of the optical corrector 32. To allow the optical train 45 to point in the desired directions, a preferred roll/nod movement is illustrated in FIGS. 2 and 3. The optical train support 48 rotates about the axis of elongation 25, as indicated by arrow 50. A gimbal 52 produces a nodding movement indicated by arrow 54 about a transverse axis 56 that is perpendicular to the axis of elongation 25 (and thence the axis of rotation). The combination of movements 50 and 54 allows the optical train 42 to be pointed in any desired rotational and azimuthal directions. In another approach within the scope of the present invention, the optical train 45 may be mounted on an X-Y rotational gimbal support, which permits the optical train 45 to rotate about two transverse axes, so that the rotational movement is not required.

The entire optical train 45 may optionally be moved forwardly or rearwardly parallel to the axis of elongation 25 by a linear axial movement, indicated by arrow 58. The axial movement 58 of the optical train support 48 allows the optical train 42 to be axially positioned for optimal performance relative to the window 24 and to the optical corrector 32. The movements 50, 54, and 58 are produced by conventional actuators which are known for other purposes.

The movements 42 and 44 of the optical corrector 32, where provided, and the movements 50, 54, and 58 of the optical train 45, may be entirely independent of each other or may be mechanically and/or electrically linked. For example, the rotational movement 42 of the optical corrector 32 may be linked together with, or even accomplished by, the same actuator as the rotational movement 50 of the optical train 45. In that case, the optical train 45 looks through the same portion of the optical corrector 32 for all angles of rotation about the axis of elongation 25. Similar linkages are possible for the axial movements 44 and 58, for example.

Figure 8:
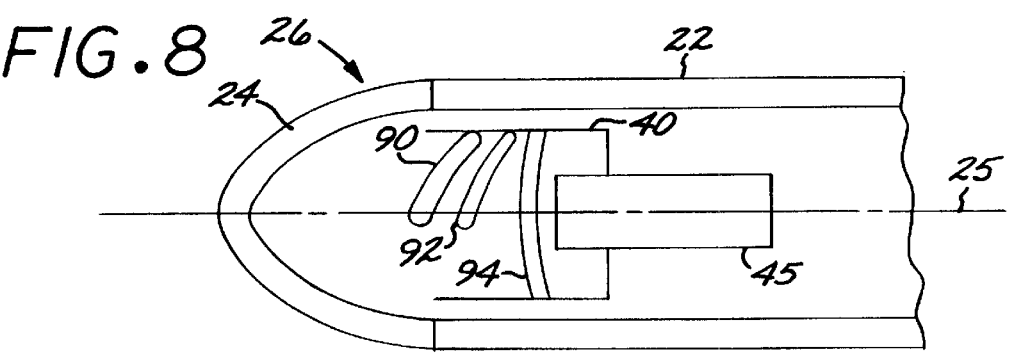
FIG. 8 is a schematic diagram of third embodiment of an optical system according to the invention.

The corrector 32 having the modified XY polynomial form may be used alone, or in conjunction with other corrector elements. FIGS. 2–3 illustrate a single corrector 32 having the modified XY polynomial form. FIG. 8 schematically illustrates an optical system 26 having a first corrector 90 with the modified XY polynomial form, a second corrector 92 with a modified XY polynomial form different from that of the optical corrector 90, and a third corrector 94 with a form other than a modified XY polynomial form. In FIG. 8, elements common to the other embodiments are assigned the same reference numerals, and the discussion of these other elements and the prior discussion of the system is incorporated here. The various optical correctors may be used in any operable combination, with some or all stationary and some or all movable. In this embodiment, the optical train 45 is illustrated in a general form.

FIG. 7 depicts a preferred approach for designing, tailoring, and operating the optical system 26. The physical components of the optical system, as described previously, are provided, numeral 70. The optical corrector 32 is designed and fabricated, and the movements 42, 44, 50, 54, and 58 are interrelated and programmed for subsequent service applications using an iterative procedure, numerals 72, 74, 76, and 78.

First, the optical characteristics of the window 24 are evaluated, numeral 72. This evaluation establishes the nature of the aberration introduced into the wavefront of an incident optical ray as it passes through the window 24, for all relevant incident positions and angles. This evaluation may be performed using conventional optical ray analysis and the known and/or measured shape of the window 24. The shape of the window 24 is dictated to a large degree by aerodynamic requirements, but it may also be fine-tuned according to optical requirements.

The required shape and position of the optical corrector 32 are calculated as a function of its position and the incident optical ray positions and angles, using conventional optical ray analysis. The shape and positioning of the optical corrector 32 are chosen to establish selected optical characteristics of the optical beam after it has passed through the window 24 and the optical corrector 32. Examples of such characteristics include deviation of the apparent angle to the target, optical power or focal length as a function of optical ray position and angle, and axially symmetric aberration. The designed shape of the optical corrector 32 is then changed to adjust for asymmetric aberrations such as coma and astigmatism. In this analysis, the symmetric aberrations are preferably chosen to be constant as the elevation angle is changed, whereas the asymmetric aberrations that change with elevation angle are corrected to acceptably small values. The optics of the optical train may also be designed to correct symmetrical aberrations to acceptably small values. In the final stages of the design process, the optical elements of the optical train 45 are designed to correct all of the symmetrical aberrations to acceptably small values. These aberrations have been rendered nearly constant by the prior design steps. In the design process, the values of the constants c, k, and $C_j$ are determined. Based upon this design process, the optical corrector is fabricated, numeral 74.

The selection of the design of the optical corrector 32 is thus distinct from conventional design of the optical train 45. The shape of the optical corrector 32 is selected responsive to the characteristics of the window 24, and its shape is related to that of the window in the sense that the optical corrector is designed to correct for aberrations introduced by the window 24. The optical corrector 32 is therefore primarily used in conjunction with non-spherical windows, where correction of aberrations is more difficult than for spherical windows. By comparison, the optical train 45 is designed to alter the ray path substantially independent of considerations of the shape of the window, so as to achieve particular properties of the optical beam when it reaches the sensor 47.

The window 24, the optical corrector 32, and the optical train 45 are mounted on the fuselage 22, optical corrector support 40, and optical train support 48, respectively, numeral 76. Test optical signals received at the sensor 47 are evaluated during manufacturing. The associated values of such of the movements 42, 44, 50, 54 and 58 that are provided which yield the optimal optical properties are determined and stored, numeral 78. If these received optical signal properties are acceptable and within specifications, the manufacturing and assembly process is complete. Errors and aberrations are also determined and stored, so that they may be accounted for by other processing. If the results achieved are not acceptable, the steps 72, 74, 76, and 78 are repeated as necessary until acceptable results are obtained. Typically, the modification may be achieved by reworking the optical corrector 32 until its properties are acceptable, by polishing, grinding, machining and other known working operations.

Once the optical corrector 32 is fabricated and the positions of the movements 42, 44, 50, 54, and 58 yielding acceptable optical properties are known, the missile and its optical system are placed into service, numeral 80. When the optical system 26 is to be used during service, the angular positions of the movements 50 and 54 are typically chosen in order to point the optical train 45 along a desired line of sight. The optimum angular positions of the other movements 42, 44, and 58 (collectively, the "support positions"), associated with those desired angular positions of the movements 50 and 54, are recalled from the memory established during the initial manufacturing and calibration operation, steps 72, 74, 76, and 78, and set using the respective actuators, numeral 82. The result is an optimum image reaching the sensor 47 for all desired viewing (pointing) angles of the optical train.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical system, comprising:

a curved window;

an optical train including at least one optical element operable to alter an optical ray incident thereon;

a movable optical train support upon which the optical train is mounted, the optical train support being operable to point the optical train along a plurality of directions, the plurality of directions including a z axis lying perpendicular to a reference plane having orthogonal x and y axes lying therein;

an optical corrector disposed in an optical path between the window and the at least one optical element of the optical train, the optical corrector comprising a transparent body having an optical corrector shape responsive to a shape of the window and which is bilaterally symmetric about the z axis in a yz cross section and not bilaterally symmetric about the z axis in an xz cross section;

a sensor disposed to receive the optical ray passing sequentially through the window, the optical corrector, and the optical train.

2. The optical system of claim 1, wherein the optical corrector has an inner surface and an outer surface, at least one of the inner surface and the outer surface of the optical corrector having a shape defined by an asymmetric modified polynomial.

3. The optical system of claim 1, wherein the optical corrector has an inner surface and an outer surface, at least one of the inner surface and the outer surface of the optical corrector having a shape defined by $$z = \frac{cr^2}{1+\sqrt{1-(1+k)c^2r^2}} + \sum C_j x^m y^n$$

wherein z is the coordinate oriented perpendicular to the reference plane, c is a constant vertex curvature, k is a conic constant, $r^2=x^2+y^2$, x and y are the coordinates lying in the reference plane, $C_j$ are constants, m and n are constants, and $j=[(m+n)^2+m+3n]/2+1$.

4. The optical system of claim 1, wherein the optical corrector has an inner surface and an outer surface, at least one of the inner surface and the outer surface of the optical corrector having a shape defined by $$z = \frac{cr^2}{1+\sqrt{1-(1+k)c^2r^2}} + \sum_{j=2}^{j=66} C_{j+1} x^m y^n$$

wherein z is the coordinate oriented perpendicular to a reference plane, c is a constant vertex curvature, k is a conic constant, $r^2=x^2+y^2$, x and y are the coordinates lying in the reference plane, $C_{j+1}$ are constants, m and n are constants, $(m+n)\leq 10$, and $j=[(m+n)^2+m+3n]/2+1$.

5. The optical system of claim 1, wherein the optical corrector comprises a scoop-shaped piece of transparent material having a curvature different from a curvature of the window.

6. The optical system of claim 1, wherein the optical train support includes
    a gimbal upon which at least one of the optical elements is mounted.

7. The optical system of claim 1, wherein the optical train support includes
    a roll-nod gimbal upon which at least one of the optical elements is mounted.

8. The optical system of claim 1, wherein the optical element is selected from the group consisting of a lens, a mirror, and a prism.

9. The optical system of claim 1, further including
    a movable optical corrector support upon which the optical corrector is mounted.

10. The optical system of claim 1, wherein the window is mounted to a housing having an axis of elongation coincident with the z axis.

11. The optical system of claim 10, further including
    a movable optical corrector support upon which the optical corrector is mounted.

12. The optical system of claim 11, wherein the optical corrector support is movable in a direction parallel to the axis of elongation.

13. The optical system of claim 11, wherein the optical corrector support is rotatable about the axis of elongation.

14. The optical system of claim 10, wherein the optical train support is movable in a direction parallel to the axis of elongation.

15. The optical system of claim 1, wherein the optical corrector comprises a segment of a surface extending about the z axis.

16. An optical system, comprising:
    a curved window;
    an optical train including at least one optical element operable to alter an optical ray incident thereon;
    a movable optical train support upon which the optical train is mounted;
    a transparent optical corrector disposed in an optical path between the window and the at least one optical element of the optical train and having an optical corrector shape responsive to a shape of the window, wherein the optical corrector has an inner surface and an outer surface, at least one of the inner surface and the outer surface of the optical corrector having a shape defined by $$z = \frac{cr^2}{1+\sqrt{1-(1+k)c^2r^2}} + \sum C_j x^m y^n$$

wherein z is a coordinate oriented perpendicular to a reference plane, c is a constant vertex curvature, k is a conic constant, $r^2=x^2+y^2$, x and y are coordinates lying in the reference plane, $C_j$ are constants, m and n are constants, and $j=[(m+n)^2+m+3n]/2+1$; and a sensor disposed to receive the optical ray passing sequentially through the window, the optical corrector, and the optical train.

* * * * *